United States Patent
Chiu et al.

[11] Patent Number: 6,013,121
[45] Date of Patent: Jan. 11, 2000

[54] FILTER CHANGE INDICATOR

[75] Inventors: Bernard Chiu, Wellesley, Mass.; Jui-Shang Wang, Taipei, Taiwan; Stephen Gatchell, Warwick, R.I.

[73] Assignee: Honeywell Consumer Products, Inc., Southborough, Mass.

[21] Appl. No.: 09/148,191

[22] Filed: Sep. 4, 1998

Related U.S. Application Data

[62] Division of application No. 08/632,365, Apr. 10, 1996, Pat. No. 5,862,737.

[51] Int. Cl.$^7$ .................................................. B01D 35/143
[52] U.S. Cl. ................................ 96/416; 96/417; 96/421; 55/417; 55/467; 55/DIG. 34
[58] Field of Search .............................. 96/417, 421, 423, 96/416; 55/DIG. 34, 467, 471; 116/DIG. 25, 272, 268

[56] References Cited

U.S. PATENT DOCUMENTS

| | | | |
|---|---|---|---|
| 4,162,660 | 7/1979 | Albertson et al. | 55/DIG. 34 |
| 5,433,762 | 7/1995 | Chiu | 55/467 |

*Primary Examiner*—David A. Simmons
*Assistant Examiner*—Robert A. Hopkins
*Attorney, Agent, or Firm*—John E. Toupal; Harold G. Jarcho

[57] ABSTRACT

This invention relates to a filter change indicator that is operable in various orientations of the device incorporating it. For example, the filter change indicator is operable when the device is positioned in either the upright or sideways position. The device incorporating the filter change indicator can be any air moving device which incorporates a cleanable or replaceable filter. The filter change indicator includes a transparent viewing window and a tubulation. The viewing window displays a visible signal when the filter needs changing. The visible signal can be a float retained in the tubulation. The tubulation is a hollow transparent tube which forms an incline plane within the housing. The tubulation includes a first end, a second end and a step. The first end is in fluid communication with an air flow path through the tubulation, and this air flow path is exposed to atmospheric pressure. The second end opens into an air flow path formed between the inlet and outlet at a location downstream of an air filter. When a predetermined pressure differential develops across the tubulation, a predetermined force develops inside the tube which lifts the float from the first end of the tubulation to a position at the second end. The lifting force causes the float to come to rest in the tubulation at a position adjacent the viewing window.

20 Claims, 4 Drawing Sheets

FILTER CHANGE INDICATOR

This application is a divisional of application Ser. No. 08/632,365 filed on Apr. 10, 1996, now U.S. Pat. No. 5,862,737 issued on Jan. 26, 1999.

BACKGROUND OF THE INVENTION

1. Field of Invention

This invention relates generally to an air cleaning or filtering device which utilizes a cleanable or replaceable filter cartridge, and more particularly to a portable air cleaning or filtering device that includes a multipositional filter change indicator for indicating when to clean or replace the filter cartridge.

2. Background of Invention

Many air cleaning devices employ replaceable filters formed of an absorbent material arranged to establish a circuitous air flow path produced by an electrically powered blower. During normal operation of such air cleaning devices, the filters progressively accumulate particles that reduce the filter's permeability. Eventually, particulate accumulation in the filter diminishes the air flow through the air cleaning device significantly reducing its efficiency. At that time, the filter must be replaced to restore efficient air cleaning.

To assist a user in maintaining an efficient air cleaning operation, some air cleaning devices are equipped with indicators for monitoring the condition of a filter and indicating when it should be replaced. One such indicator comprises a transparent, vertically disposed tube having a lower end at atmospheric pressure and an upper end communicating with an internal portion of the air cleaner downstream from the filter. As the filter becomes clogged with particulate matter, an increased pressure drop occurs across the filter and a negative pressure is produced downstream thereof. As a result, a differential pressure occurs across the indicator tube and creates a force within the tubulation that lifts a visible indicator into a viewing window to provide an indication of a dirty filter.

Generally, the filter change indicator operates in one position, for example, with the air cleaning device oriented in either the upright or sideways position. Often the air cleaning device itself is operable in various positions, but the filter indicator becomes inoperative when the air cleaning device is placed in an orientation other than the indicator's intended operating position. The present invention overcomes the limitations of the prior art by providing a filter change indicator which is operable in various orientations of the device incorporating it.

SUMMARY OF THE INVENTION

This invention relates to a filter change indicator that is operable in various orientations of the device incorporating the indicator. For example, the filter change indicator is operable when the device is positioned in either the upright or sideways position. The device incorporating the filter change indicator can be any air moving device which incorporates a cleanable or replaceable filter.

One embodiment of the invention is incorporated in an air cleaning device which includes a housing having an air inlet, an air outlet and an air flow path formed between the inlet and outlet. The device also includes a blower disposed in the housing and arranged to move air along the flow path. A variable speed motor supplies power to the blower, and includes a speed regulator for varying the motor speed.

Varying the motor speed simultaneously causes a variation in the blower speed. As the motor speed increases, the blower speed increases. The blower draws air through a filter disposed in the air flow path. Once the permeability of the filter becomes reduced to a predetermined level, the filter change indicator alerts the user of the need to change or clean the filter.

The filter change indicator includes a transparent viewing window and a tubulation. The viewing window displays a visible signal when the filter needs changing. The visible signal can be a float retained in the tubulation.

The tubulation is a hollow transparent tube which forms an incline plane within the housing. The tubulation includes a first end, a second end and a step. The first end is in fluid communication with an air flow path through the tubulation, and this air flow path is exposed to atmospheric pressure. The second end opens into the air flow path formed between the inlet and outlet at a location inside the housing downstream of the filter. When a predetermined pressure differential develops across the tubulation, a predetermined force develops inside the tube which lifts the float from the first end of the tubulation to a position at the second end. The lifting force causes the float to come to rest in the tubulation at a position adjacent the viewing window.

The tubulation slopes within the housing such that the first end is at a lower vertical position than the second end. The upward slope of the tubulation permits the float to remain at the first end of the tubulation until a sufficient force develops in the tubulation to cause the float to move up the incline and into the viewing window. When the air cleaning device is placed in the sideways position, the slope of the tubulation is steeper than when the air cleaning device is in the upright position. The steeper the slope, the greater the force needed to lift the float into the viewing window. To keep the lifting forces in the upright and sideways positions equal, the tubulation includes a step behind which the float rests when in the air cleaning device is positioned in the upright position. The step is designed such that the magnitude of the force needed to overcome the step and to move the float up the tubulation's incline equals the magnitude of the lifting force generated in the sideways position.

The lifting force developed in the tubulation is proportional to the air flow rate through the tubulation. As the blower speed increases, the air flow rate through the tubulation also increases. To account for the variation in the air flow rate that may be generated through the tubulation due to variations in blower speed, the filter indicator uses an air flow metering system. The air flow metering system includes a selector switch which defines an orifice. For air to flow through the tubulation, the orifice must be in partial or full alignment with a second aperture formed in the housing adjacent the selector switch. When the motor and blower are operating at the highest speed setting, the air flow path between the orifice and the aperture is substantially blocked, thus increasing the air flow resistance and reducing the air flow rate through the tubulation to a predetermined constant rate. As the blower speed changes, the overlap between the orifice and the slot also changes so as to maintain a substantially constant air flow rate through the tubulation regardless of the blower speed setting. Once the pressure differential across the tubulation reaches a predetermined level, sufficient forces develop in the tubulation which lift the float into the viewing window.

The object of this invention therefore is to provide an improved filter change indicator that is capable of operating in multiple orientations of the device incorporating it.

Another object of this invention is to provide an improved filter change indicator that is operable when the device is placed in either the upright or sideways position.

A further object of the invention is to provide an air flow metering system adapted to maintain a substantially constant air flow rate through the filter change indicator.

The foregoing and other objectives, aspects, features, and advantages of the invention will become more apparent from the following description of the drawings, the detailed description, and the claims.

DETAILED DESCRIPTION

This invention relates to a device which includes a filter change indicator capable of operating in the various orientations of the device incorporating the indicator. In a preferred embodiment, the filter change indicator is designed to operate when the device is positioned in the upright and sideways positions. The filter change indicator can be incorporated into any air moving, cleaning or filtering device which uses a cleanable or replaceable filter. Such devices can include, but need not be limited to, air conditioners, fans, humidifiers, heaters and air purifiers or air cleaners.

Figure 1:
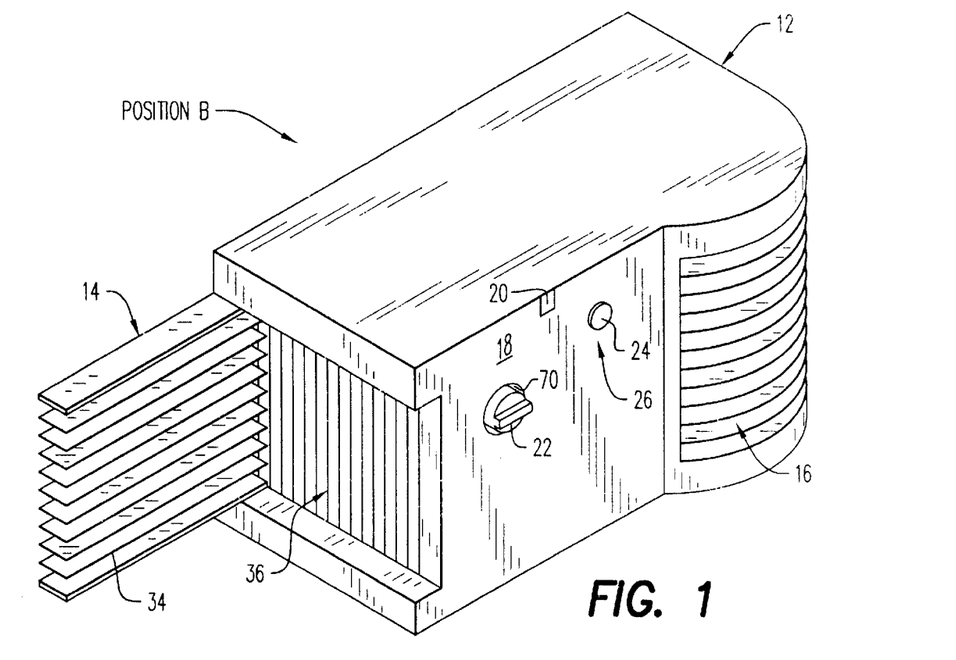
FIG. 1 is a perspective view of an air cleaning device oriented in the sideways position, and incorporating a filter change indicator formed in accordance with the teachings of the present invention.
Figure 2:
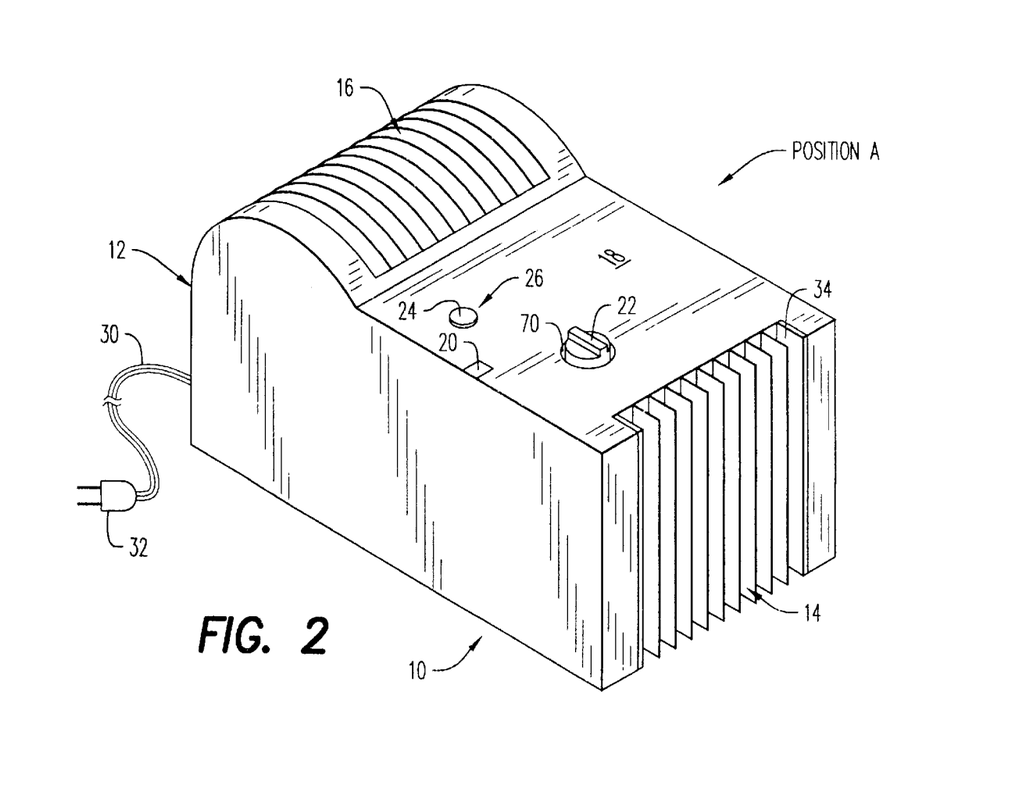
FIG. 2 is a perspective view of the air cleaning device shown in FIG. 1 oriented in the upright position.
Figure 3:
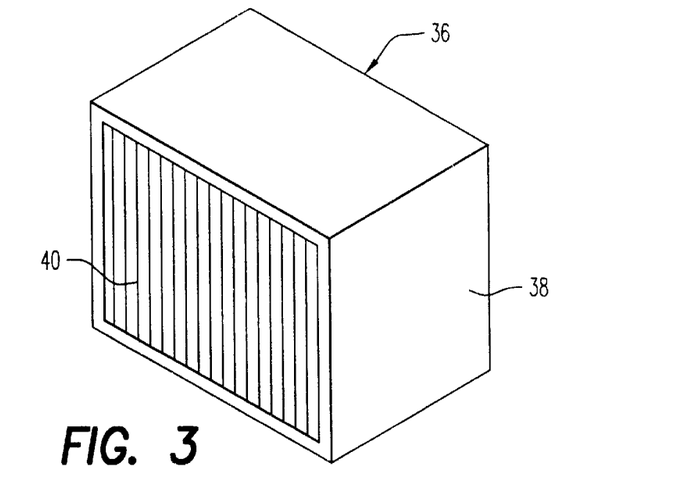
FIG. 3 is a perspective view of the filter cartridge incorporated in the air cleaning device shown in FIG. 1.

With reference to FIGS. 1 and 2, the invention is shown embodied in an air cleaning device 10. The air cleaning device 10 includes a portable housing 12 having at one end a grill work that defines an air inlet 14 and at an opposite end a grill work that defines an air outlet 16. A side door 34 of the housing 12 defines the inlet 14, and slidably couples to he housing 12 so as to be movable into an open position. In its open position, the side door 34 provides physical access to a removable filter cartridge 36 (FIG. 3) retained within the housing 12. The filter cartridge 36 is a conventional type filter, and includes an outer casing 38 which retains a permeable fibrous filter material 40. The filter material 40 permits an air flow through the filter cartridge 36 while trapping particulate matter entrained in the air flow.

Figure 6:
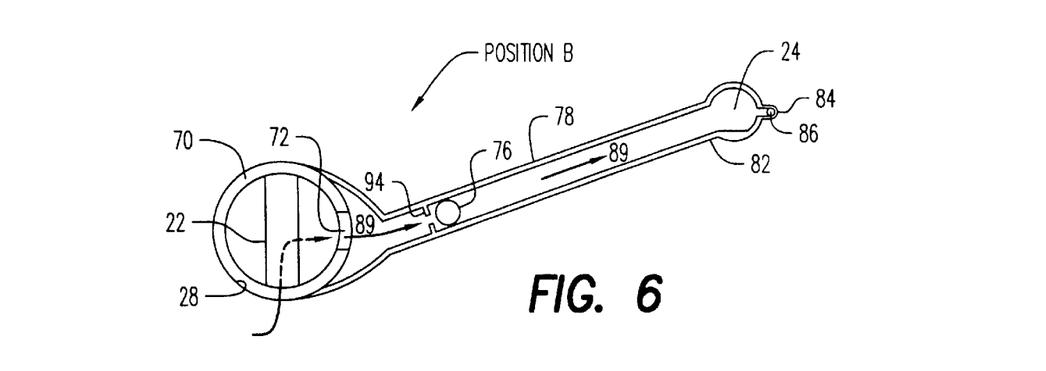
FIG. 6 is a section view of the filter change indicator incorporated in the air cleaning device shown in FIG. 1.
Figure 7:
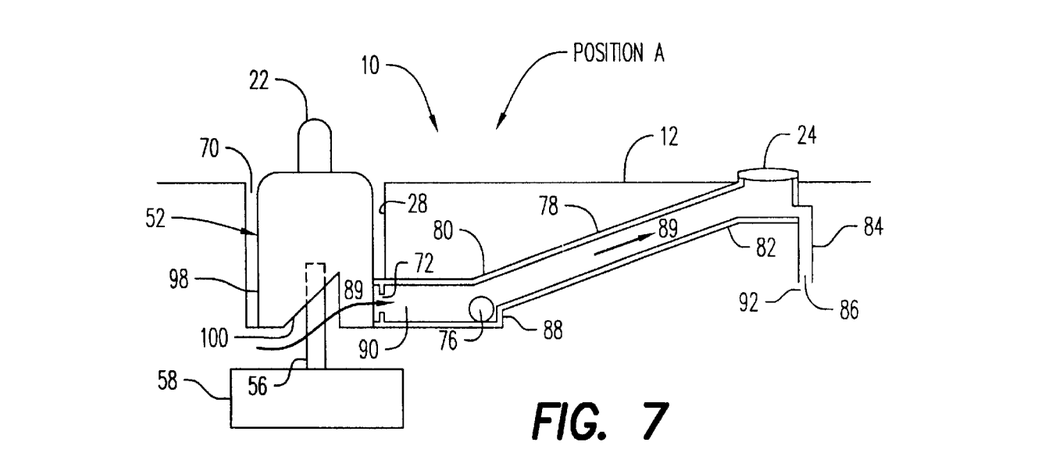
FIG. 7 is a section view of the filter change indicator incorporated in the air cleaning device shown in FIG. 1.
Figure 8:
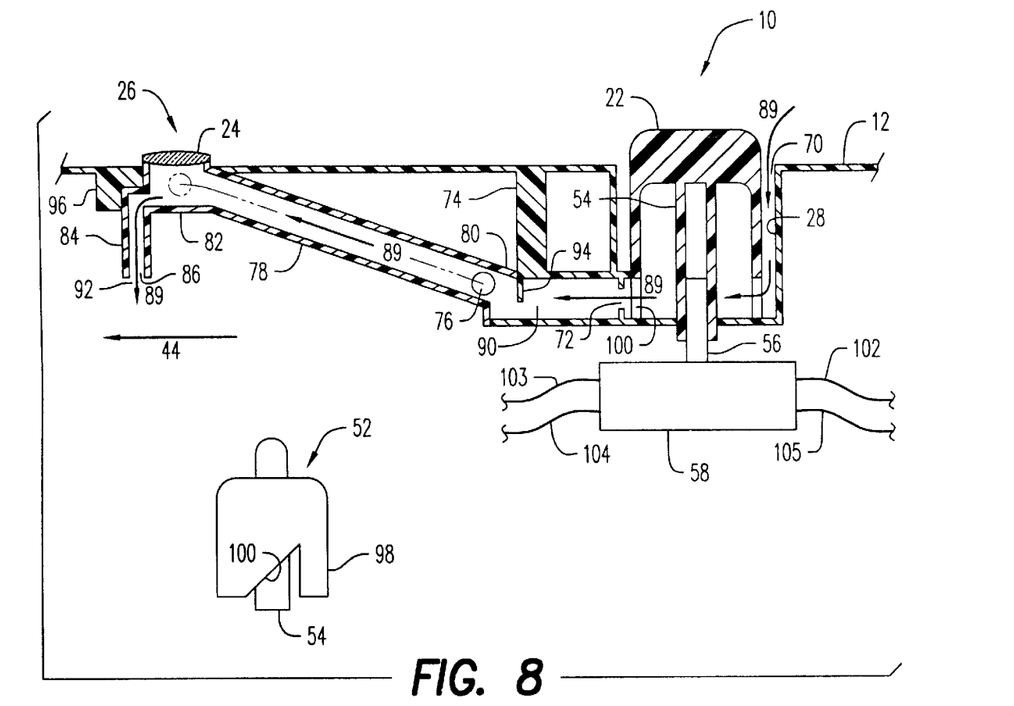
FIG. 8 is a section view of the filter change indicator incorporated in the air cleaning device shown in FIG. 1.

Disposed between the air inlet 14 and the air outlet 16 is a control panel 18 that includes a power light 20, a manual actuator knob 22 and a viewing window 24 which forms one element of the filter change indicator 26. The control panel 18 defines an atmospheric aperture 70 below the actuator knob 22. As shown in FIGS. 6–8, the control panel 18 also defines a recessed cavity 28 which retains the actuator knob 22. The recessed cavity 28 defines a slot 72 which opens into a support structure 74 retained in the housing 12. The control panel 18 also can include an ionizer on/off switch (not shown) and an ionizer power indicator light (not shown). The ionizer (not shown) is preferably disposed within the housing 12.

The viewing window 24 defines juxtaposed outwardly facing curved surfaces through which is visible a device for alerting an observer to change the filer cartridge 36. In one embodiment of the air cleaning device 10, a moveable float 76 can be observed in the viewing window 24 when the filter cartridge 36 needs changing. The inner and outer surfaces of the viewing window 24 form a lens that magnifies the float 76 to provide the observer with a larger visual image of the float 76 than its actual size. The float 76 becomes visible in the viewing window 24 only if a sufficient negative pressure exists inside the housing to cause the float 76 to rise inside the tubulation 78 and come to rest just below the view ng window 24 as shown by the dashed lines in FIG. 8.

As shown in FIGS. 4 and 6–8, the tubulation 78 forms the other element of the filter change indicator 26. The tubulation 78 is a hollow transparent tube which detachably couples to the housing 12, and retains the float 76. The tubulation 78 forms, an incline plane within the housing 12, and includes a first end 80, a second end 82 and a step 88. As shown in FIGS. 4, 6, 7 and 8, the tubulation defines a hollow center and includes an elongated surface having sidewalls that define a continuous, uniform, hollow central passage between the first and second ends of the tubulation. This uniform central passage permits the float to travel up the tubulation as shown in FIGS. 6, 7 and 8, and air to flow between the first end 80 and the second end 82. The first end 80 is at a lower vertical position in the housing 12 in relation to the second end 82, and is supported by a bracket 94 formed at the distal end of the support structure 74. The first end 80 is in fluid communication with an air flow path 89 formed between the aperture 70 and the second end 82. As shown in FIG. 7, the step 88 defines a recessed surface at the first end 80 of the tubulation 78. When the air cleaning device 10 is in position A, see FIG. 7, the float normally sits on and is retained by the vertical wall of the recessed surface. When a predetermined pressure differential exists across the tubulation 78, the float 76 moves up the tubulation 78 and into the viewing window 24. When the air cleaning device is in position B, see FIG. 6, the float 76 rests against bracket 94 and does not fall down onto the recessed surface. The first end 80 is exposed to a pressure at location 90 in the air flow path 89 which approximately equals atmospheric pressure. The second end 82 of the upwardly inclining tubulation 78 is supported by a bracket 96 disposed in the housing 12. A protrusion 84 extends from the second end 82. The protrusion 84 defines an aperture 86 through which the second end 82 communicates with the fluid flow path 44 at a location 92 downstream of the filter cartridge 36.

Figure 4:
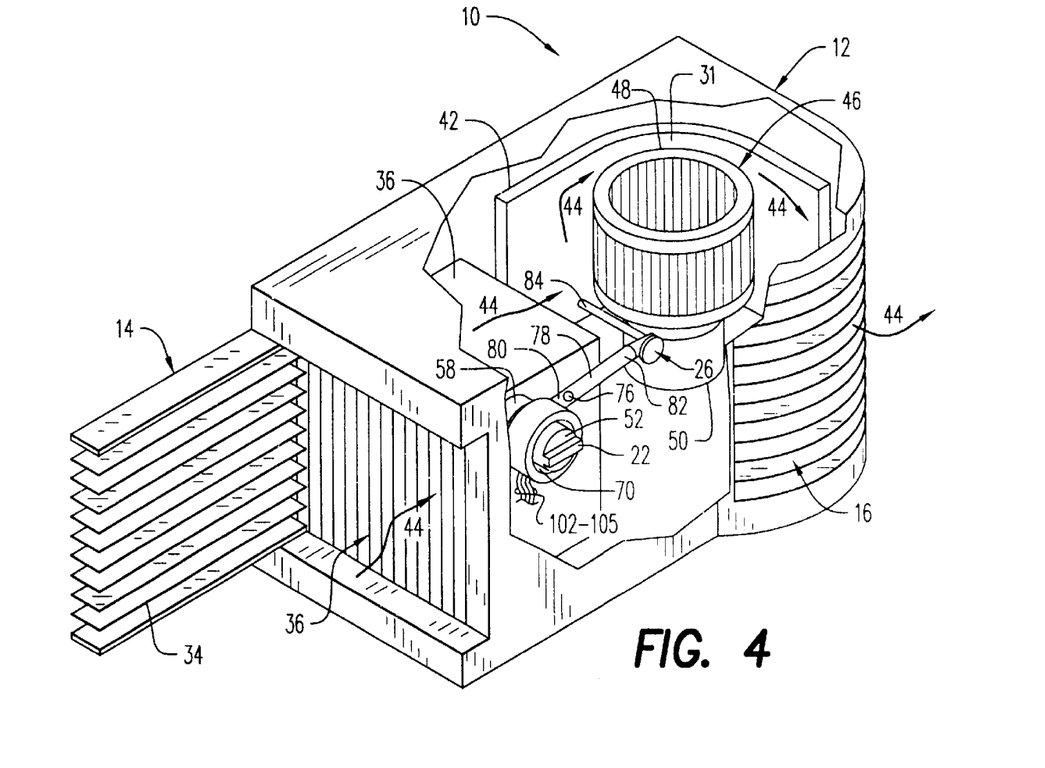
FIG. 4 is a section view of the air cleaning device shown in FIG. 1, illustrating the orientation of the filter change indicator inside the air cleaner housing.

As shown in FIG. 4, the housing 12 and an internal curve d baffle 42 define the air flow path 44 between the air inlet 14 and the air outlet 16. The filter cartridge 36 is placed in the air flow path 44, and an air moving assembly 46 also is located in the air flow path 44 at a location 31 downstream of the filter cartridge 36. The air moving assembly 46 includes a blower wheel 48 and a multiple speed motor 50 rotatably coupled thereto. The motor 50 speed is adjusted by a rotary selector switch 52 which rotatably couples to the actuator knob 22 by shaft 54 as shown in FIGS. 6–8. Another shaft 56 rotatably couples the selector switch 52 via shaft 54 to a multiple contact rotary electrical switch 58.

Switches 52 and 58 and actuator knob 22 can form three separate components, or they can form one integral element.

In the preferred embodiment, the switch 52 and the actuator knob 22 form one integral unit which couples to electrical switch 58 via shafts 54 and 56. Rotating the actuator knob 22 causes the rotation of selector switch 52 and consequently the simultaneous rotation of electrical switch 58. The air cleaning device 10 therefore is activated to one of its three operating conditions by rotating the integrally formed actuator knob 22 and selector switch 52.

The selector switch 52 includes a valve body 98 rotatably coupled to shaft 54. The valve body 98 defines an orifice 100. Rotating the selector switch 52 into one of the three operating conditions causes the valve body 98 to rotate the orifice 100 into either full or partial alignment with the slot 72 formed in the housing 12. For instance, rotating the selector switch 52 to the first operating condition causes the orifice 100 to become partially aligned with the slot 72. With the selector switch 52 in the second operating condition, the valve body 98 rotates so that a greater portion of the orifice 100 overlaps the slot 72 relative to the overlap created in the first operating condition. Finally, rotating the selector switch 52 to the third operating condition causes the orifice 100 to become substantially aligned with the slot 72, thus increasing the overlap between the orifice 100 and the slot 72.

Figure 5:
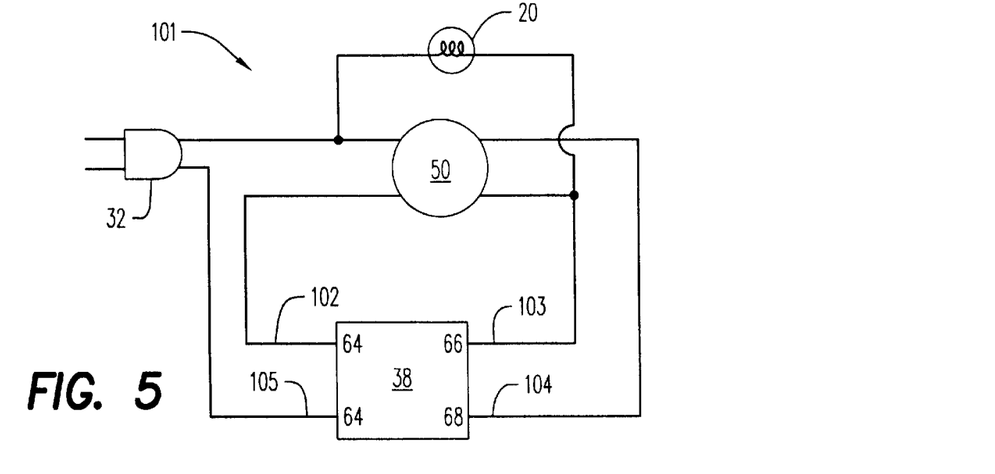
FIG. 5 is an electrical circuit diagram showing the power connections for the air cleaning device shown in FIG. 1.

The electrical switch 58 includes electrical leads 102–105 and a moveable contact 62 as shown in FIGS. 5 and 8. A control circuit 101 connects the leads 102–105 to the electrical cord 30 attached to plug 32 and motor 50 windings (not shown). The plug 32 extends out of the housing 12 and is adapted for insertion into a conventional alternating current ("AC") power outlet socket (not shown). The moveable contact 62 permits the electrical switch 58 to rotate from the "off" position to one of three operating conditions: high, medium or low. Rotation of the electrical switch 58 into the first operating condition moves the contact 62 into electrical engagement with a first contact 64 while rotation of the electrical switch 58 into the second operating condition moves the movable contact 62 into electrical engagement with a second contact 66. Rotation of the electrical switch 58 into the third operating condition moves the movable contact 62 into engagement with a third contact 68.

In the first operating condition of the electrical switch 58 voltage at the plug 32 is applied through the closed contacts 62, 64 across the full motor 50 windings to establish a first, high speed, operational mode of the motor 50 and blower wheel 48. In the second operating condition of the electrical switch 58, voltage at plug 32 is applied through closed contacts 62, 66 to create a second, medium speed, operational mode of the motor 50 and blower wheel 48. Finally, in the third operating condition of the electrical switch 58, the voltage at plug 32 is applied through closed contacts 62, 68 to establish a third, low speed, operational mode.

OPERATION

The filter change indicator 26 operates in the upright (position A) and sideways (position B) positions. The upward incline of the tubulation 78 and the gravitational force on the float 76 permit the float 76 to remain at the lower end 80 of the tube 78. When a predetermined pressure differential exists across the tubulation 78, a force develops in the tubulation 78 which lifts the float 76 up the tubulation 78 and into the viewing window 24. The lifting force generated therefore relates to the pressure differential formed across the tubulation 78 between the first end 80 and the second 82.

With the air cleaning device 10 in the sideways position, position B, the slope formed by the tubulation 78 is steeper than that formed by the tubulation 78 when the air cleaning device 10 is in the upright position, position A, as shown in FIGS. 1–2 and 6–8. To generate a lifting force in position A equal to that generated in position B, a step 88 is added to the tubulation 78 in position A. The additional force needed in position A to overcome the step compensates for the reduced slope of the tubulation 78 in this position. Consequently, the force needed to overcome the step 88 coupled with the force needed to lift the float 76 into the viewing window 24 approximately equals the total force generated in position B to lift the float 76 into the viewing window 24. One of skill in the art will appreciate that the tubulation 78 can be constructed so that the slope of the tubulation in position B equals that of position A, eliminating a need for the step 88.

In operation the air cleaning device 10 receives electrical power by inserting the plug 32 into a suitable AC outlet and rotating the switch 52 into one of its operating positions. The motor 50 becomes energized and causes a rotation of the blower wheel 48. The resultant rotation of the blower wheel 48 draws air into the air inlet 14 and through the filter cartridge 36 for centrifugal discharge through the air outlet 16. Under normal conditions, the permeability of the filter material 40 produces a relatively small pressure drop across the filter cartridge 36. The pressure differential creates an air flow path 89 through the tubulation 78 between its lower end 80 and its upper end 82 that is insufficient to lift the float member 76 into the viewing window 24. A predetermined lifting force develops when particle clogging reduces the permeability of the filter material 40 to a predetermined limit. As a result, an increase in the pressure drop develops across the filter cartridge 36 and negative pressure builds up in the housing 12 at location 92, developing lifting forces inside the tubulation 78 sufficient to move the float 76 into the viewing window 24. The presence of the float 76 in the viewing window 24 indicates the desirability for filter cartridge 36 replacement.

Referring now to FIGS. 1 and 6, the air cleaning device 10 is oriented in the sideways position, position B. Rotating the selector switch 52 to its first operating condition causes the motor 50 to operate at its highest speed. When the motor 50 is operating at its highest speed, a partial overlap exists between the orifice 100 and the slot 72. This partial overlap creates an air flow rate through the tubulation 78 that is sufficient to lift the float member 76 into the viewing window 24 if the permeability of the filter cartridge 36 has reached the predetermined minimum limit.

It should be noted however that in the absence of the orifice 100, operation of the motor 50 in its high speed condition would increase the negative pressure at location 92. Accordingly, the float 76 would rise in the tubulation 78 even though the permeability of the filter cartridge 36 had not reached the predetermined minimum level. The indicator 26 accounts for this undesirable circumstance through the use of an air flow metering system.

The air flow metering system includes the orifice 100 formed by valve body 98 of the selector switch 52 and slot 72 defined by the housing 12. Together these two apertures regulate the air flow rate through the tubulation 78. Varying the overlap between the orifice 100 and the slot 72 restricts the air flow through the tubulation 78 to a predetermined rate. As the speed of the blower 48 decreases, the overlap between orifice 100 and slot 72 increases, thus allowing a constant air flow rate through the tubulation 78 regardless of the blower 48 speed.

In the second operating condition (medium speed) of the motor 50, the blower 48 speed is reduced. To maintain a substantially constant air flow rate through the tubulation 78, the selector switch 52 rotates the valve body 98 so that a greater portion of the orifice 100 overlaps the slot 72. The increased overlap between the orifice 100 and the slot 72 permits the air flow rate to remain substantially constant through the tubulation 78 despite the decreased blower 48 speed. Consequently, when the permeability of the filter cartridge 36 reaches the predetermined level, a predetermined force develops in the tubulation 78, and the float 76 traverses the tubulation and moves into the viewing window 24.

Finally, when the motor 50 is in the third operating condition, the blower 48 is in its lowest speed condition. The selector switch 52 rotates the orifice 100 so that the orifice 100 substantially overlaps the slot 72. The overlap between the orifice 100 and the slot 72 permits the development of a predetermined air flow rate through the tubulation 78. When the permeability of the filter cartridge 36 reaches the predetermined level, a predetermined force lifts the float 76 to the viewing window 24.

Referring now to FIGS. 2 and 7, when the air cleaning device 10 is in the upright position, position A, the float 76 rests behind a step 88 formed in the tubulation 78. Because the slope of the tubulation 78 is not as steep as that of the tubulation in position B, the step 88 introduces additional resistive forces which must be overcome to move the float 76 into the viewing window 24. Thus, to lift the float 76 into the viewing 24, sufficient forces must be developed to lift the float over the step 88 and into the viewing window 24. The step 88 is designed such that the force generated in position A to move the float 76 into the viewing window 24 equals the lifting force generated in position B.

Rotating the selector switch 52 to its first operating condition causes the motor 50 to operate at its highest speed. When the motor 50 is in its highest speed setting, a partial overlap exists between the orifice 100 and slot 72. If the permeability of the filter cartridge 36 has reached the predetermined minimum limit, this partial overlap permits the development of a predetermined force through the tubulation 78 sufficient to lift the float 76 over the step 88 and move the float 76 up the tubulation 78 and into the viewing window 24. This lifting force approximately equals that developed when the air cleaning device 10 is in position B and operating at the highest motor 50 speed setting.

In the second and third operating conditions (medium/low speed) of the motor 50, the valve body 98 is rotated so that a greater portion of the orifice 100 overlaps the slot 72. The overlap of the orifice 100 and the slot 72 permits the development of the minimum orifice size needed to maintain a constant air flow through the tubulation 78, and when the permeability of the filter cartridge 36 reaches the predetermined replacement level, a predetermined force develops in the tubulation 78 which lifts the float 76 over the step 88 and into the viewing window 24. Again, the lifting force developed in each operating condition approximately equals that generated when the air cleaning device 10 is in position B and operating at the medium and low speed settings.

Obviously, many modifications and variations of the present invention are possible in light of the above teachings. For example, coupling arrangements other than specifically described can be used between the selector valve 52 and the switch 58. It is to be understood therefore that the invention can be practiced otherwise than as specifically described.

We claim:

1. An air conditioning device comprising:

a housing defining an air inlet, an air outlet, an air flow path between said inlet and said outlet, a substantially planar first mounting surface for supporting said housing on a support surface in a given orientation, and a substantially planar second mounting surface for supporting said housing on the support surface in a predetermined orientation different than said given orientation;

a blower disposed in the housing and arranged to move air in said air flow path from said inlet to said outlet;

an air filter disposed in said air flow path;

a tubulation defining a first end, a second end, and an inclined surface therebetween; said tubulation being arranged such that said second end is disposed above said first end with said housing in either of said given orientation or said predetermined orientation; and wherein said first end is in communication with a reference pressure source and said second end is in communication with said air flow path downstream of said filter; and an indicator member movable on said inclined surface between said first and second ends of said tubulation and being visible in at least said second end thereof; said indicator being movable between said first end and said second end in response to changes in the differential air pressure therebetween.

2. An air conditioning device according to claim 1 wherein said housing comprises a bottom wall, a top wall, first and second side walls joining said top and bottom walls and first and second end walls joining said top and bottom walls; said first mounting surface is said bottom wall; and said second mounting surface is said first side wall.

3. An air conditioning device according to claim 2 wherein said second end is disposed at an intersection of said top wall and said second side wall.

4. An air conditioning device according to claim 3 including a multiple speed motor coupled to said blower, a blower control for varying the speed of said motor to provide selective different operational modes of said blower, and an air flow metering system for regulating the air flow rate through said tubulation in response to the selected operational mode of said blower.

5. An air conditioning device defined in claim 4 wherein the tubulation is transparent.

6. An air conditioning device defined in claim 5 wherein the tubulation defines a hollow center and receives the visible indicator therein.

7. An air conditioning device defined in claim 6 wherein the visible indicator is a float.

8. An air conditioning device according to claim 1 wherein said housing defines an atmosphere opening communicating with said first end of said tubulation.

9. An air conditioning device according to claim 8 wherein said housing comprises a bottom wall, a top wall, first and second side walls joining said top and bottom walls and first and second end walls joining said top and bottom walls; said first mounting surface is said bottom wall; and said second mounting surface is said first side wall.

10. An air conditioning device according to claim 9 wherein said second end is disposed at an intersection of said top wall and said second side wall.

11. An air conditioning device according to claim 10 including a multiple speed motor coupled to said blower, a blower control for varying the speed of said motor to provide selective different operational modes of said blower, and an air flow metering system for regulating the air flow rate through said tubulation in response to the selected operational mode of said blower.

12. An air conditioning device defined in claim 11 wherein the tubulation is transparent.

13. An air conditioning device defined in claim 12 wherein the tubulation defines a hollow center and receives the visible indicator therein.

14. An air conditioning device defined in claim 13 wherein the visible indicator is a float.

15. The air conditioning device defined in claim 1 wherein the device is a fan.

16. The air conditioning device defined in claim 1 wherein the device is a humidifier.

17. The air conditioning device defined in claim 1 wherein the device is a heater.

18. The air conditioning device defined in claim 1 wherein the device is an air conditioning apparatus.

19. The air conditioning device defined in claim 1 wherein the device is an air purifier.

20. An air conditioning device according to claim 1 wherein said tubulation is inclined relative to at least one of said first substantially planar mounting surface and said second substantially planar mounting surface.

* * * * *

UNITED STATES PATENT AND TRADEMARK OFFICE
CERTIFICATE OF CORRECTION

PATENT NO. : 6,013,121
DATED : January 11, 2000
INVENTOR(S) : Chiu et al

It is certified that error appears in the above-indentified patent and that said Letters Patent is hereby corrected as shown below:

Column 3, line 53 "he" should read --the--.
Column 4, line 9, "filer" should read --filter--.
Column 4, line 18, "view ng" should read --viewing--.
Column 4, line 54, "curve" should read "curved--.
Column 4, line 55 "d" should be canceled.

Signed and Sealed this

Third Day of April, 2001

Attest:

NICHOLAS P. GODICI

Attesting Officer    Acting Director of the United States Patent and Trademark Office